United States Patent
Lochet et al.

(10) Patent No.: US 9,547,326 B2
(45) Date of Patent: Jan. 17, 2017

(54) MECHANICAL ASSEMBLY OF THE PRESS-BUTTON TYPE, AND APPLICATION TO AN ELECTRICAL APPARATUS

(75) Inventors: Anthony Lochet, Beaumont sur Sarthe (FR); Jean-Luc Chaumeny, Solignac (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 366 days.

(21) Appl. No.: 14/118,297

(22) PCT Filed: Apr. 30, 2012

(86) PCT No.: PCT/FR2012/050956
§ 371 (c)(1),
(2), (4) Date: Dec. 11, 2013

(87) PCT Pub. No.: WO2012/156612
PCT Pub. Date: Nov. 22, 2012

(65) Prior Publication Data
US 2014/0090509 A1    Apr. 3, 2014

(30) Foreign Application Priority Data
May 18, 2011  (FR) ..................... 11 54320

(51) Int. Cl.
*F16B 21/00*   (2006.01)
*G05G 1/02*   (2006.01)
(Continued)

(52) U.S. Cl.
CPC ............. *G05G 1/025* (2013.01); *F16B 21/071* (2013.01); *F16B 21/073* (2013.01);
(Continued)

(58) Field of Classification Search
CPC ..... F16B 21/071; F16B 21/078; F16B 21/073; F16B 21/075; F16B 5/0664; G05G 1/025; H02G 3/14
See application file for complete search history.

(56) References Cited

U.S. PATENT DOCUMENTS 3,197,549 A * 7/1965 Good .............................. 174/66
3,394,838 A * 7/1968 Larkin .......................... 220/326
(Continued)

FOREIGN PATENT DOCUMENTS

DE    8503906 U1    5/1985
GB    1149268 A *    4/1969 ............. F16B 5/128
(Continued)

OTHER PUBLICATIONS

International Search Report for corresponding application PCT/FR2012/050956 filed Apr. 30, 2012; Mail date Jul. 19, 2012.

*Primary Examiner* — Daniel P Stodola
*Assistant Examiner* — Matthew R McMahon
(74) *Attorney, Agent, or Firm* — Cantor Colburn LLP

(57) ABSTRACT

The invention relates to a possibly reversible mechanical assembly, comprising a first component (1), a second link itself comprising a stud (3) linked to the first component (1) and formed of a stock (30) terminated by a radial bulge (31), and holding means (4) linked to the second component (2) and comprising a housing (40) dimensioned to receive the stud (3) and at least one elastic lock (41) designed to elastically hold the radial bulge of the stud in the housing (40). According to the invention, the housing (40) is formed by drilling of the second component (2) along its thickness, and each elastic lock (41) is essentially formed by an elastically flexible lug (41) formed in the thickness of the second component (2) and exhibiting a degree of radial play of non-zero amplitude.

7 Claims, 6 Drawing Sheets

(51) Int. Cl.
*F16B 21/07* (2006.01)
*H02G 3/14* (2006.01)

(52) U.S. Cl.
CPC ............ *F16B 21/078* (2013.01); *H02G 3/14* (2013.01); *Y10T 74/20396* (2015.01)

(56) References Cited

U.S. PATENT DOCUMENTS

| | | | | |
|---|---|---|---|---|
| 3,987,928 | A * | 10/1976 | Mori | 220/241 |
| 4,924,349 | A * | 5/1990 | Buehler et al. | 361/643 |
| 5,297,322 | A * | 3/1994 | Kraus | F16B 21/073 24/297 |
| 5,379,912 | A * | 1/1995 | Wolf | 220/481 |
| 6,382,867 | B2 * | 5/2002 | Serre | 403/329 |
| 6,964,412 | B2 * | 11/2005 | Costello et al. | 267/179 |
| 7,230,183 | B2 * | 6/2007 | Oddsen et al. | 174/66 |
| 7,306,482 | B1 * | 12/2007 | Kidman | 439/538 |
| 7,531,745 | B1 * | 5/2009 | Gretz | 174/66 |
| 7,602,619 | B2 * | 10/2009 | Fabrizi | 361/807 |
| 8,245,453 | B2 * | 8/2012 | Struthers et al. | 52/27 |
| 2005/0074280 | A1 * | 4/2005 | Chen | 403/329 |
| 2008/0044255 | A1 * | 2/2008 | Rosemann | F16B 5/0628 411/508 |
| 2010/0155099 | A1 | 6/2010 | Peck | |

FOREIGN PATENT DOCUMENTS

| | | |
|---|---|---|
| NL | 6817070 A | 6/1969 |
| WO | 2009132749 A1 | 11/2009 |

* cited by examiner ns of US 9,547,326 B2

MECHANICAL ASSEMBLY OF THE PRESS-BUTTON TYPE, AND APPLICATION TO AN ELECTRICAL APPARATUS

TECHNICAL FIELD

The invention is generally concerned with techniques for connecting two components to each other, possibly in a reversible fashion.

To be more precise, a first aspect of the invention concerns a mechanical assembly comprising a first component, a second component, and a press-button connection, the connection comprising a stud connected to the first component and retaining means connected to the second component, the stud having, in its lengthwise direction, a stock projecting from the first component, extending in an axial direction, and terminating in a radial bulge, and the retaining means comprising a housing sized to receive the stud that is selectively introduced therein in the axial direction and at least one elastic lock, disposed in the housing, mobile transversely to the axial direction, and spring-loaded toward a rest position in which this elastic lock leaves in the housing a passage narrower than the overall size of the radial bulge, the thickness of the second component extending in the axial direction, this second component being produced in an elastically flexible self-supporting material, the housing being formed by a bore in the second component in the direction of its thickness, and each elastic lock being essentially formed by an elastically flexible lug formed within the thickness of the second component, delimited at the periphery of the housing by a first edge, and having a degree of radial play of non-zero amplitude.

BACKGROUND

Assemblies of this type have been well known for a long time for connecting two pieces of cloth to each other in a reversible fashion.

On the other hand, when the components to be assembled are rigid, assembly is traditionally carried out by exploiting the transverse flexibility of an assembly member extending in the direction of movement toward each other of the two components to be assembled, as FIG. 8 of US patent application 2010/0155099 shows, for example.

However, this connecting principle always leads to a large overall size, to the point at which it is sometimes necessary to give up on assembling the two components, in a possibly reversible fashion, and, in the end, to stick them or weld them to each other.

BRIEF SUMMARY

In this context, the invention proposes a mechanical assembly enabling two relatively rigid components to be connected to each other within an overall size less than that to which the known assembly solutions lead, which assembly is preferably able to withstand careful disassembly.

To this end, the assembly conforming to the invention, otherwise conforming to the generic definition thereof given by the above preamble, is essentially characterized in that the first edge of each lug includes a counter bore.

Here the term "bore" is to be understood as the result of the action of passing completely through a component, regardless of the process employed to obtain this result.

The term "formed" as applied to the elastically flexible lug is to be understood here as not implying any a priori restriction as to the process employed to produce this lug.

The term "self-supporting" is to be understood here as being applicable to any material capable of supporting its own weight without suffering significant deformation, in contrast to what is notably the case for cloth.

In the sense employed in the present description, an "elastically flexible self-supporting" material therefore comprises any material the rigidity and the elasticity of which are sufficient to enable it to revert spontaneously and at least approximately to its initial shape after it has been subjected to a stress with an amplitude that is tolerated for the use for which the component made from this material is intended.

Moreover, the term "radial" is to be understood here as being applicable to any element or movement having at least one dimension or one component perpendicular to the axial direction.

Accordingly, instead of exploiting the transverse flexibility of an assembly member extending in the direction of movement toward each other of the two components to be assembled, the assembly conforming to the invention exploits the flexibility of a lug formed within the thickness of the second component and therefore not leading to any additional overall size in the axial direction of movement toward each other of the two components.

The second component preferably has a corresponding radial clearance opening for each lug produced within the thickness of this second component, each lug having a second edge which delimits it from the corresponding opening, this lug therefore extending between its first and second edges.

Each lug may advantageously have a free end so as to have maximum flexibility.

The first edge of each lug includes a counter bore, in which case it is possible for the stud on the one hand and the counter bore of the first edge of each lug on the other hand to have, in a plane passing through the axial direction, respective at least partly complementary profiles, the complementary nature of these profiles favoring the retention of the radial bulge of the stud by each lug.

In all cases, the length of the stud may be less than or at most equal to the thickness of the second component, at least around the connection, the overall size of this connection in the axial direction therefore being zero or negligible.

In the preferred case in which the first component is also produced in a self-supporting material, the stud may be in one piece with this first component, independently of the inherent elasticity of the material in which this first component is produced, provided that this material satisfies the requirements in respect of resistance to pulling off imposed by the use for which this stud is intended.

Nor does the stud need to be in one piece and it may notably be formed of two parts separated from each other by a slot extending in the axial direction.

The retaining means preferably comprise at least two elastically flexible lugs at least partly surrounding the housing.

These retaining means may in particular comprise two elastically flexible lugs disposed head-to-tail around the housing and forming a clamp.

In practice at least one of the first and second components may advantageously be produced by molding a polymer or a mixture of polymers.

Although this is not limiting on the invention, the mechanical assembly conforming to the invention is notably applicable to the optionally reversible fixing to one another of at least two elements of electrical apparatus of the type comprising a plate, a sub-plate, and/or a support.

BRIEF DESCRIPTION OF THE DRAWINGS

Other features and advantages of the invention will emerge clearly from the following description thereof given by way of nonlimiting illustration and with reference to the appended drawings, in which.

DETAILED DESCRIPTION

Figure 1:
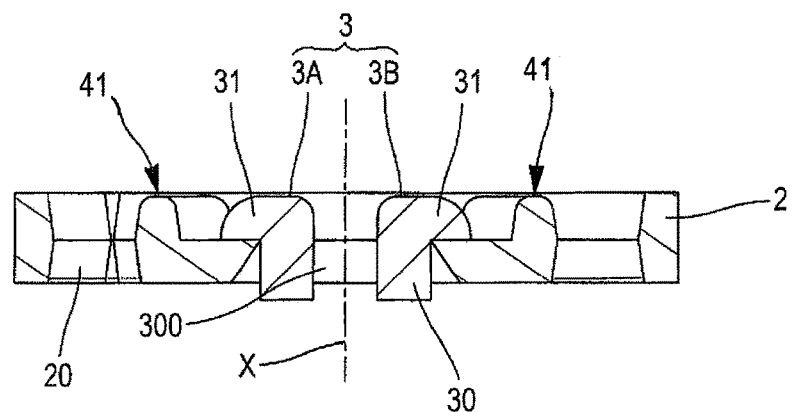
FIG. 1 is a view in axial section of an assembly conforming to the invention, this view being essentially limited to the connection of this assembly, and this assembly being observed in the direction defined by the arrows I-I in FIG. 2.
Figure 2:
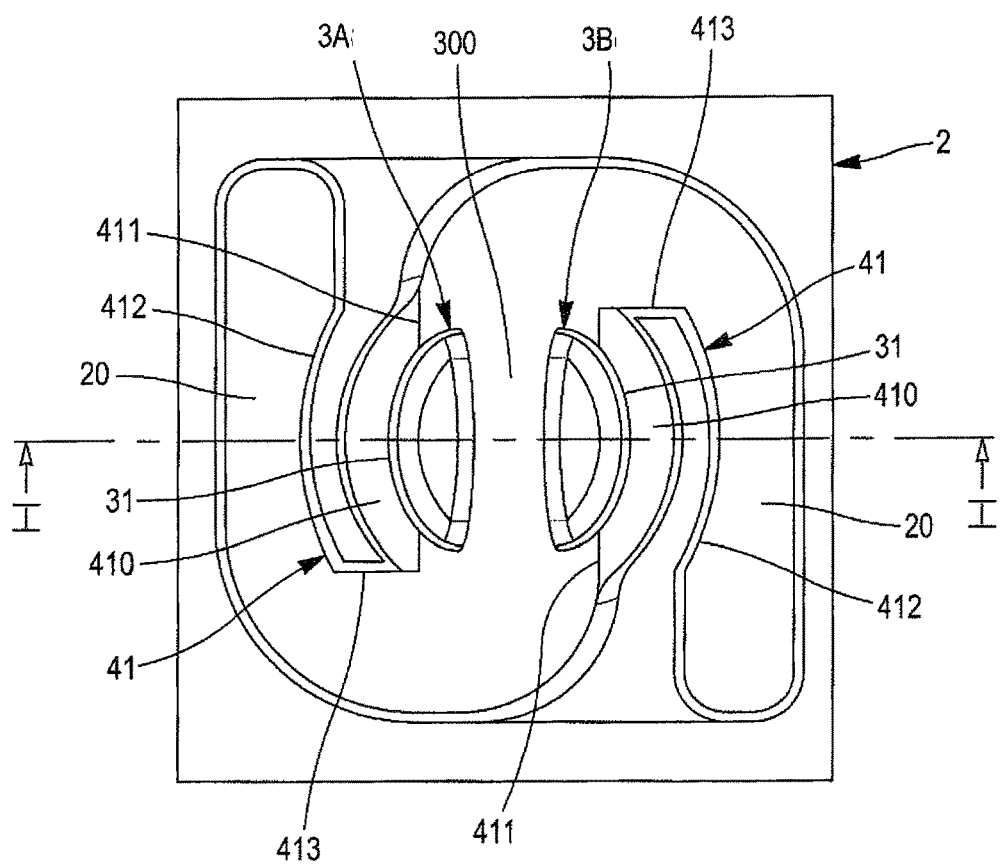
FIG. 2 is a plan view of the assembly shown in FIG. 1.
Figure 3:
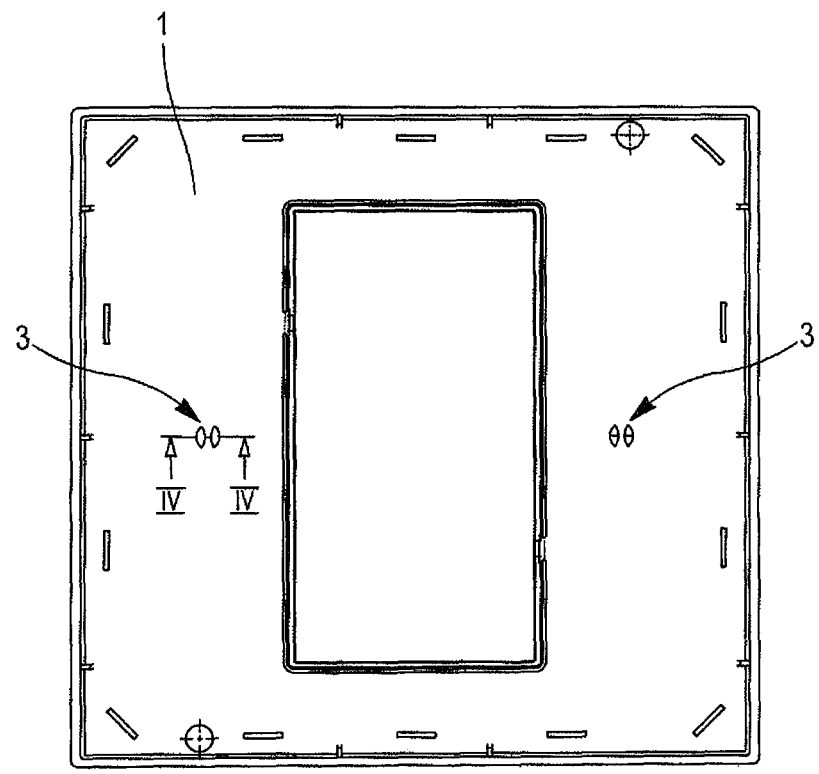
FIG. 3 is a view in elevation of a first component usable in an assembly conforming to the invention, this first component comprising, by way of example, of a plate of electrical apparatus.
Figure 4:
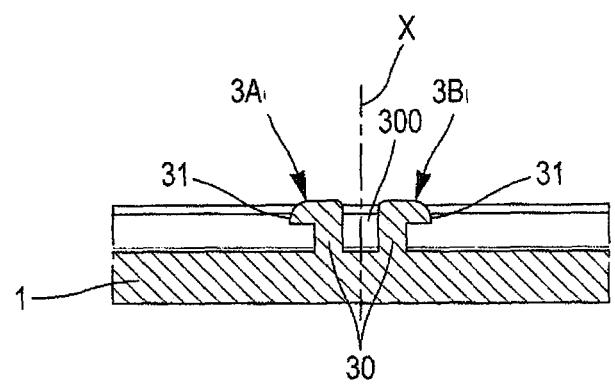
FIG. 4 is a view in axial section to a larger scale of the stud that can be seen in FIG. 3, this stud being observed in the direction defined by the arrows IV-IV in this FIG. 3.
Figure 5:
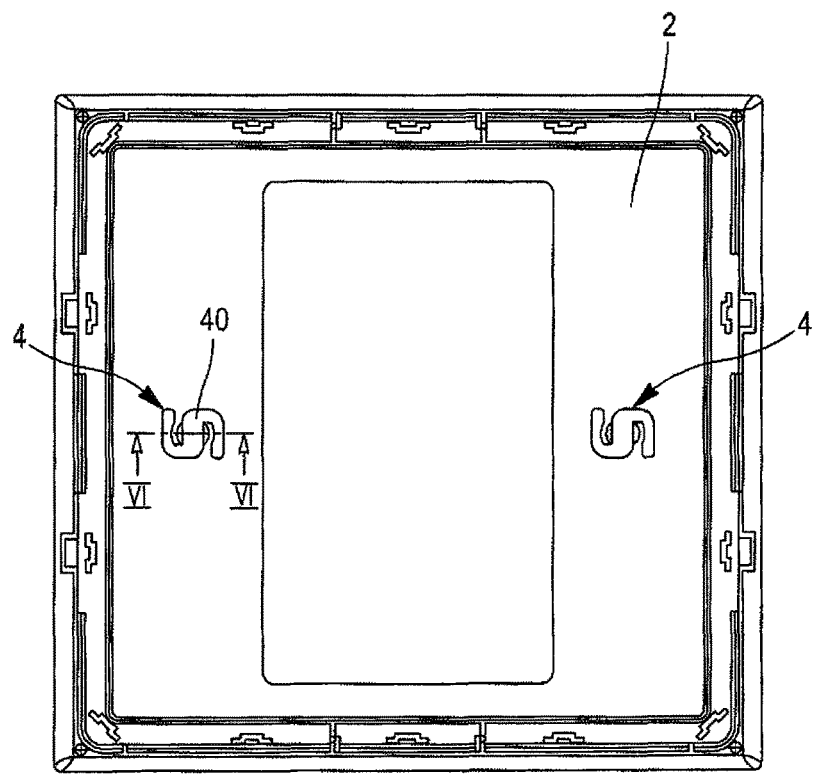
FIG. 5 is a view in elevation of a second component usable in an assembly conforming to the invention, this second component comprising, by way of example, of a sub-plate of electrical apparatus.

The principal elements shown in these figures and referred to in the present description are identified by references either between parentheses or not, the references between parentheses being allocated to the assemblies of which the elements identified by references without parentheses are part.

As stated above, the invention concerns an optionally reversible mechanical assembly comprising a first component 1, a second component 2 and a press-button connection itself comprising a stud 3 and retaining means 4.

The stud 3 is connected to the component 1 and includes, in its lengthwise direction, a stock 30 that projects from this component 1, extends in an axial direction X, and terminates in a radial bulge 31.

The retaining means 4 are connected to the other component 2 and comprise a housing 40 and one or more elastic locks 41.

The housing 40 is sized to receive the stud 3, including its radial bulge 31, when this stud is introduced into this housing 40 in the axial direction X to assemble the components 1 and 2 to each other.

Moreover, each elastic lock 41 is disposed in the housing 40, mobile transversely to the axial direction X, and spring-loaded toward a rest position in which this elastic lock 41 leaves in the housing 40 a passage narrower than the overall size of the radial bulge 31.

Thanks to this arrangement, known in itself, each elastic lock 41 is moved away from its rest position when the radial bulge 31 of the stud 3 passes it and then, having returned to its rest position after the radial bulge 31 has passed it, retains this radial bulge in place in the bottom of the housing.

According to the invention, the second component 2 is produced in an elastically flexible self-supporting material and its thickness extends in the axial direction X in which the components 1 and 2 are moved toward each other to assemble them.

In an advantageous embodiment of the invention, the component 2 is produced by molding a polymer or a mixture of polymers, for example, notably thermoplastic polymers such as polycarbonate, for example.

The housing 40 is formed directly by a bore in this component 2 in the direction of its thickness and each elastic lock 41 is essentially formed by an elastically flexible lug 41 formed within the thickness of this same component 2.

Moreover, each lug 41 is delimited at the periphery of the housing 40 by a corresponding edge 411 and has a degree of radial play of non-zero amplitude.

For example, the component 2 has a corresponding radial clearance opening 20 for each lug 41, this opening 20 being produced within the thickness of the component 2.

Each lug 41, which therefore has an edge 412 that delimits it from the corresponding opening 20, extends between its edges 411 and 412 and preferably ends at a free end 413.

It is in practice advantageous to provide for the retaining means 4 to comprise a plurality of elastically flexible lugs 41 disposed so as to surround the housing 40 at least partly.

In the preferred embodiment that is shown in the figures, these retaining means 4 comprise two elastically flexible lugs 41 that are disposed head-to-tail around the housing 40 and cooperate in the manner of the jaws of a clamp.

As a person skilled in the art will understand, the size of the lugs 41 may advantageously be determined or optimized, notably as a function of the nature of the material constituting the component 2, either by trial and error or with the aid of any of the numerous commercially available strength of material software products that enable simulation of the behavior of a mechanical component in bending and/or under load.

Figure 6:
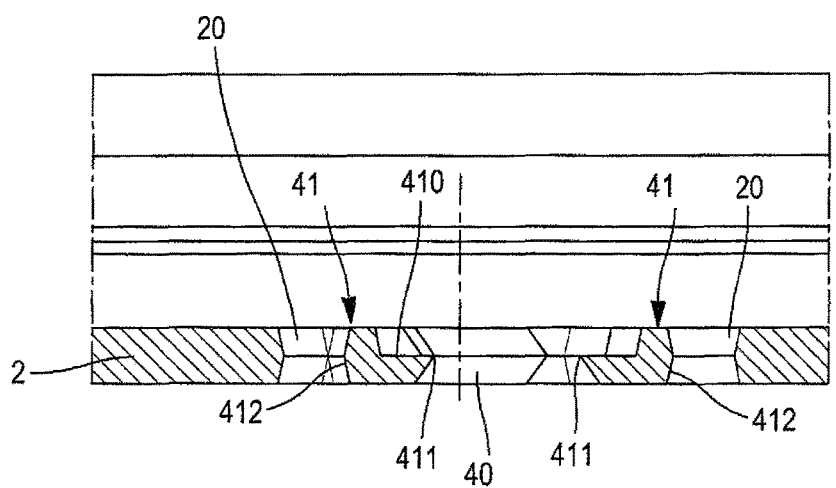
FIG. 6 is a view in axial section to a larger scale of the retaining means that can be seen in FIG. 5, these means being observed in the direction defined by the arrows VI-VI in this FIG. 5.
Figure 7:
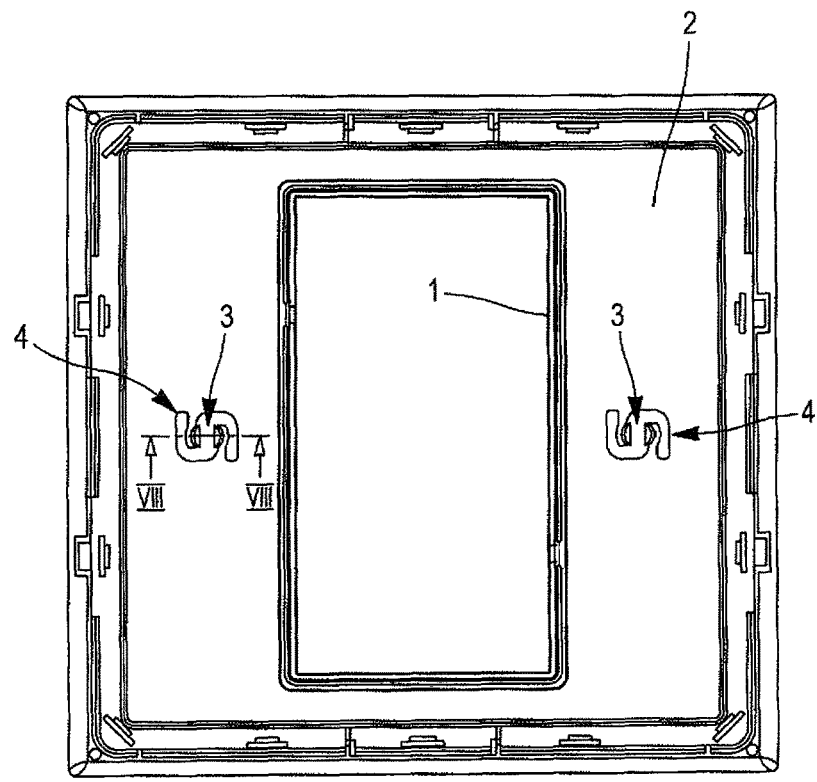
FIG. 7 is a view in elevation of an assembly conforming to the invention, this assembly comprising the plate that can be seen in FIG. 3 and the sub-plate that can be seen in FIG. 5.
Figure 9:
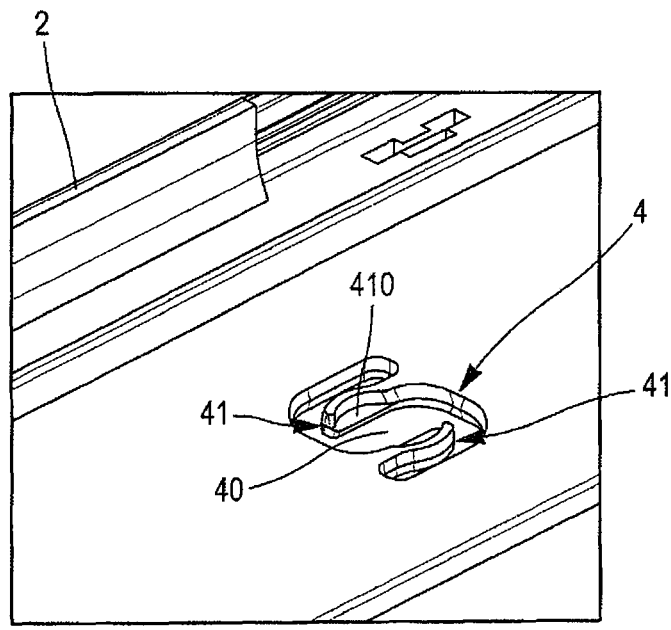
FIG. 9 is a perspective view of the second component and the retaining means that can be seen in FIGS. 5 and 6.
Figure 10:
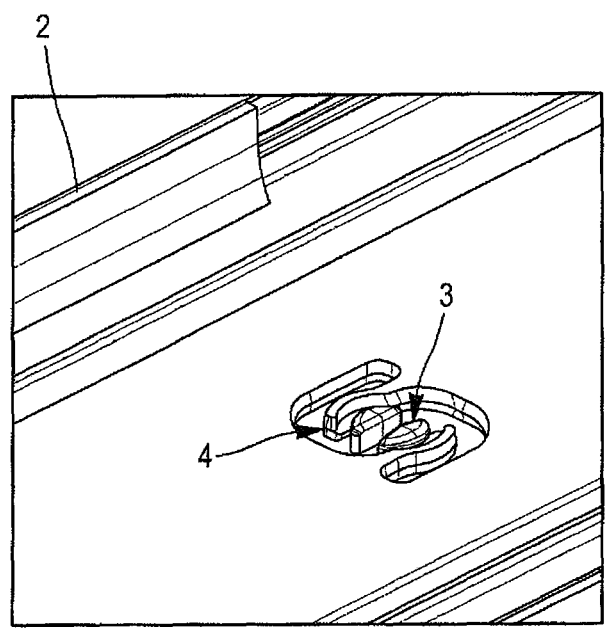
FIG. 10 is a perspective view of the assembly and the connection that can be seen in FIGS. 7 and 8.
Figure 11:
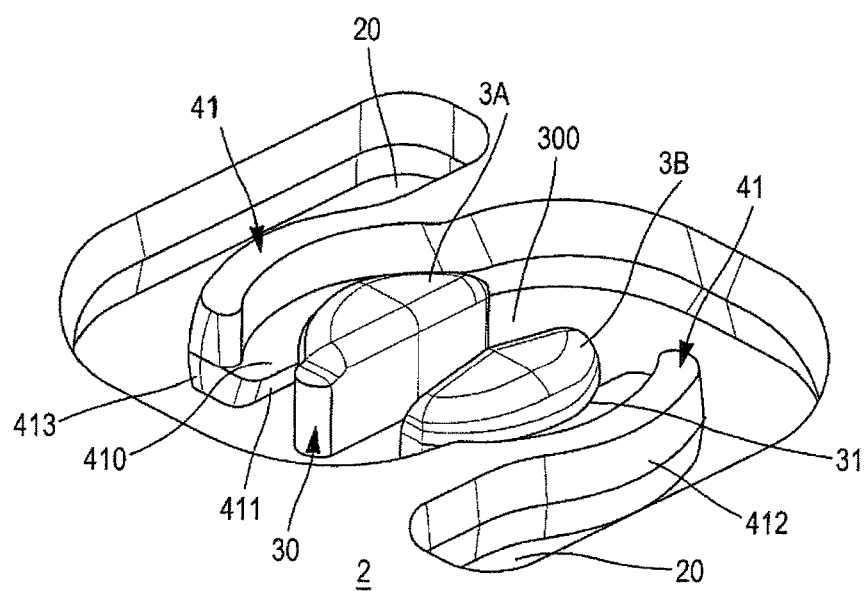
FIG. 11 is a view to a larger scale of a detail from FIG. 10.

As FIGS. 6 and 9 notably show, the edge 411 of each lug 41 preferably includes a counter bore 410, the presence of a counter bore of this kind making it possible to reduce further the overall size of the connection in the axial direction X.

Figure 8:
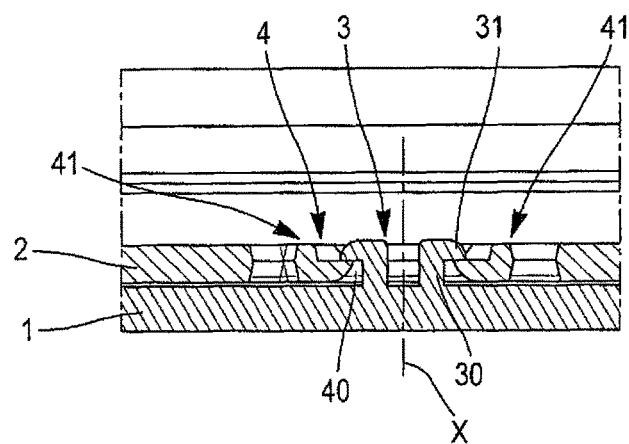
FIG. 8 is a view in axial section to a larger scale of the connection that can be seen in FIG. 7, this connection being observed in the direction defined by the arrows VIII-VIII in this FIG. 7.

In this case, the stud 3 on the one hand and this counter bore 410 on the other hand have, in a plane passing through the axial direction X and comprising the plane of FIG. 8, for example, respective at least partly complementary profiles so as to cooperate mutually with each other.

These profiles include for example external surfaces oblique with respect to the axial direction X to facilitate insertion of the stud 3 into the housing 40 and internal surfaces perpendicular to the axial direction X to favor the retention of the bulge 31 by each lug 41.

One of the benefits of the invention lies in the fact that it makes it possible to assemble two rigid components notably by means of a stud 3 without requiring that this stud has any elasticity.

This being the case, as the figures show, it suffices to impart to this stud 3 a length at most equal to the thickness of the component 2, at least around the connection comprising this stud 3 and the retaining means 4, for this connection to be entirely accommodated within the thickness of the component 2.

If the component 1 is produced in a self-supporting material, which corresponds to the preferred field of application of the invention, the stud 3 may be in one piece with the first component 1.

For example, the component 1 may also be produced by molding a polymer or a mixture of polymers, notably thermoplastic polymers, for example polycarbonate.

Moreover, the stud 3 is not restricted to being in one piece but to the contrary may be formed of two parts 3A and 3B, for example, separated from each other by a slot 300 extending in the axial direction X.

A slot 300 of this kind has at least the benefit of preventing the appearance of shrinkage cavities that could otherwise be produced if the component 1 and the stud 3 are molded in one piece and which might be judged unaesthetic if they were visible.

Although it has been shown in its application to possibly reversible fixing of the plate and the sub-plate of electrical apparatus possibly also comprising a support connected to the sub-plate, the invention has a vast field of application.

In particular, the invention may be employed whenever two molded components, notably plastic material components, must be assembled to each other, for example as is commonly the case of accessories in the field of motor vehicle construction, or decorative accessories in the fields of fashion or the home, or in any other field to obtain a decorative or customizable trim.

The invention claimed is:

1. An optionally reversible mechanical assembly comprising:
    a first component,
    a second component, and
    a press-button connection,
    the connection comprising a stud connected to the first component and retaining means connected to the second component,
    the stud having, in its lengthwise direction, a stock projecting from the first component, extending in an axial direction, and terminating in a radial bulge, and the retaining means comprising a housing sized to receive the stud that is selectively introduced therein in the axial direction and two elastic locks, each elastic lock being disposed in the housing, mobile transversely to the axial direction, and spring-loaded toward a rest position in which this elastic lock leaves in the housing a passage narrower than the overall size of the radial bulge,
    the thickness of the second component extending in the axial direction, the thickness being defined as the shortest dimension of the second component, this second component being produced in an elastically flexible self-supporting material,
    the housing being formed by a bore in the second component in the direction of its thickness, and
    each elastic lock being essentially formed by an elastically flexible lug formed within the thickness of the second component, delimited at the periphery of the housing by a first edge, and having a degree of radial play of non-zero amplitude, wherein the first edge of each lug includes a counter bore,
    wherein the second component has a corresponding radial clearance opening for each lug produced within the thickness of this second component, each lug having a second edge which delimits it from the corresponding opening, each lug extending between its first and second edges;
    wherein the two elastically flexible lugs at least partly surround the housing, said two elastically flexible lugs each having a free end, defining a head, and a fixed end, defining a tail, the fixed end of each lug being fixed to the second component and extending from opposing sides of the radial clearance opening such that the lugs are disposed in a head-to-tail configuration around the housing, wherein the head of one lug is aligned across from the tail of the other lug and the tail of the one lug is aligned across from the head of the other lug, so as to form a clamp.

2. The mechanical assembly as claimed in claim 1, wherein the stud and the counter bore of the first edge of each lug have, in a plane passing through the axial direction, respective at least partly complementary profiles.

3. The mechanical assembly as claimed in claim 1, wherein the thickness of the second component is at least equal to the length of the stud at least around the connection.

4. The mechanical assembly as claimed in claim 1, wherein the first component is produced in a self-supporting material and wherein the stud is in one piece with the first component.

5. The mechanical assembly as claimed in claim 4, wherein the stud is formed of two parts separated from each other by a slot extending in the axial direction.

6. The mechanical assembly as claimed in claim 1, wherein at least one of the first and second components is produced by molding a polymer or a mixture of polymers.

7. A method of fixing at least two elements of an electrical apparatus to one another in an optionally reversible manner using the mechanical assembly as claimed in claim 1, the electrical apparatus having a plate, a sub-plate, and/or a support, the method including the following steps:
    providing the mechanical assembly as claimed in claim 1,
    forming the first and second components of the mechanical assembly with the two elements, and
    fixing the two elements together via the press-button connection of the mechanical assembly.

\* \* \* \* \*